May 30, 1961
M. G. CARLSON ET AL
2,986,267
HYDRAULIC ACTUATED APPARATUS FOR CONTROLLING
SLACK IN CONVEYOR BELTS
Filed Nov. 2, 1959
3 Sheets-Sheet 1
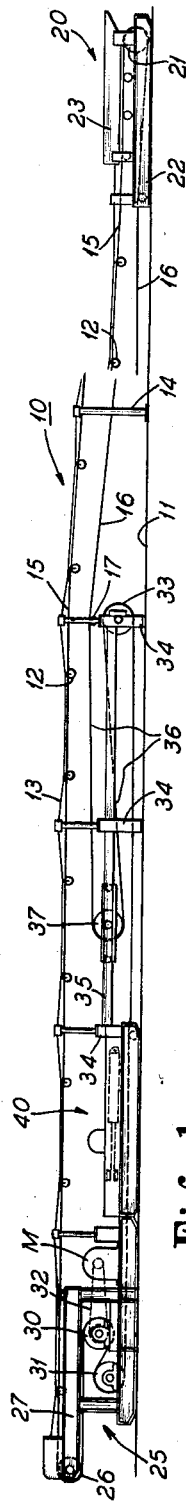
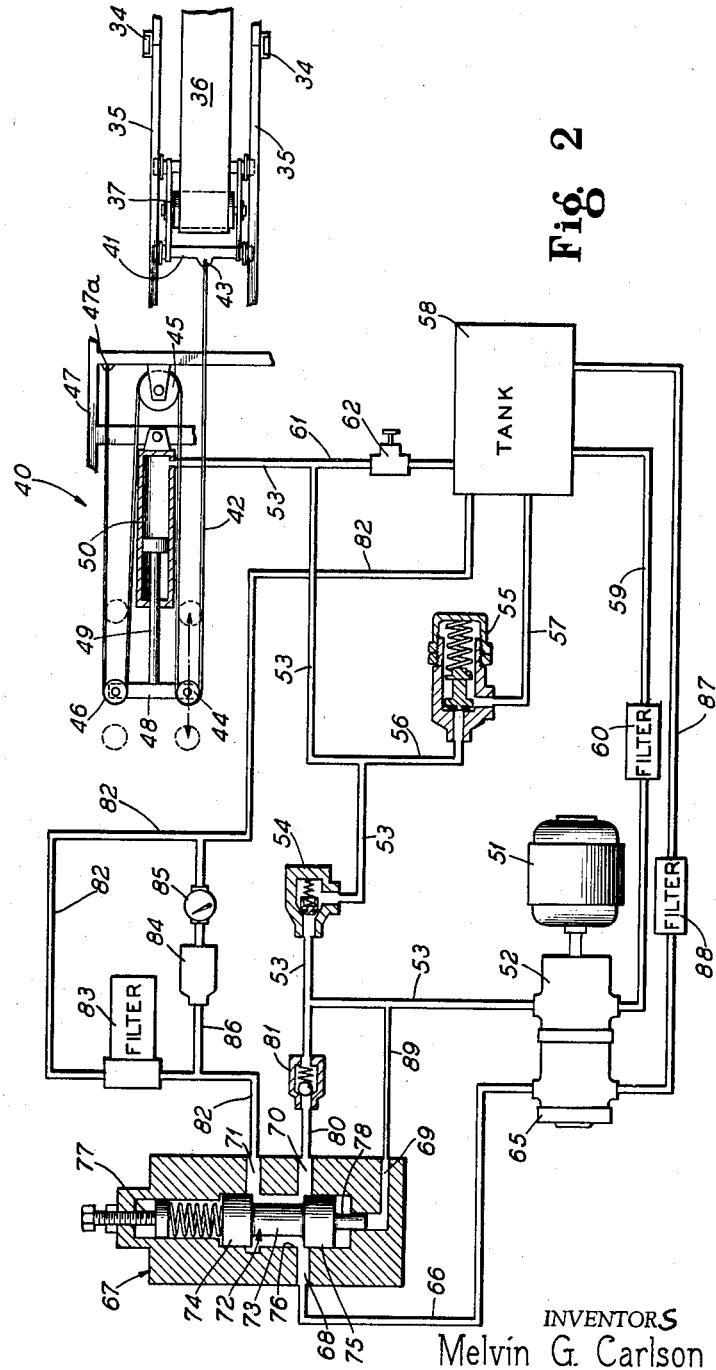
INVENTORS
Melvin G. Carlson
John J. Delaney
BY INVENTOR.
Melvin G. Carlson
BY   John J. Delaney INVENTOR.
Melvin G. Carlson
John J. Delaney United States Patent Office 2,986,267
Patented May 30, 1961

2,986,267

HYDRAULIC ACTUATED APPARATUS FOR CONTROLLING SLACK IN CONVEYOR BELTS

Melvin G. Carlson, Oak Lawn, and John J. Delaney, Chicago, Ill., assignors to Goodman Manufacturing Company, Chicago, Ill., a corporation of Illinois Filed Nov. 2, 1959, Ser. No. 850,149

14 Claims. (Cl. 198—208)

This invention relates in general to flexible belt conveyors and in particular to belt slack take-up apparatus.

Flexible belt conveyors are widely used in industry for a multitude of purposes. In very recent years, their use has increased with the development of the flexible side frame conveyor of the type illustrated in the Craggs et al. Patent Number 2,773,257. Conveyors of this general construction are widely used in underground applications, such as the coal mining industry.

Several problems common to all flexible belt conveyors which must run in confined spaces such as coal mines, have plagued the industry for years. One of the most serious is that of space. In order for the conveyor to keep pace with the seam of coal as it is worked, a substantial length of belt is stored in the system at the head end. In conventional installations, the extra belting is wound back and forth over a series of belt storage pulleys, the belt making a plurality of horizontal, generally parallel loops over the pulleys. One or several heavy weights are either directly or indirectly suspended from the parallel loops to maintain proper tension in the belt. The weights move vertically as the slack in the belt varies. The great disadvantage of this system, however, is the fact that considerable head room is needed for the vertical travel of the weights.

During startup of the belt, considerable slack is induced within the return reach of the belt, the reach in which the excess belt is stored. At the same time, the tension in the conveying reach increases. This differential belt tension during startup limits the accelerating speed of the belt, creates sliding friction, particularly between the drive pulleys and the belt which sometimes leads to mine fires, and generally makes for inefficient operation.

Accordingly, the primary object of this invention is to provide a flexible conveyor belt slack take-up apparatus which requires much less space than the conventional gravity take-up systems now in use.

Another object is to provide a hydraulic tensioning and slack take-up apparatus which is substantially instantly responsive to a slack condition to thereby provide for good belt acceleration during start up.

Yet a further object is to provide a hydraulic tensioning and belt slack take up system which substantially reduces the sliding friction between the drive pulleys and belt, particularly during start up to thereby substantially reduce the danger of mine fires.

Another object is to provide a hydraulic tensioning and belt slack take up apparatus which is extremely efficient in operation during both start up and run conditions.

Still another object is to provide a hydraulic tensioning and belt slack take up system in which a main pump supplies pressure to a reciprocable belt take up roller which puts tension in the belt during normal operation, the main pump being supplemented by an auxiliary pump which cuts in automatically in response to a drop in pressure in the system during start up.

Another object is to provide a hydraulic tensioning and belt slack take up system for a flexible belt conveyor utilizing a main and an auxiliary pump in a hydraulic circuit in which the heat in the hydraulic circuit is substantially reduced by the provision of unloading valves in the high pressure pump lines.

Another object is to provide a hydraulic tensioning and belt slack take up system utilizing a variable volume pump arrangement which provides increasing or decreasing volumes of fluid to a hydraulic take up cylinder in response to system demands in a gradual manner to thereby avoid surges of hydraulic fluid in the system.

A further object is to provide a hydraulic tensioning and belt slack take up apparatus for a flexible belt conveyor system in which hydraulic fluid is supplied to a take up or belt tensioning cylinder only when the system conditions change to thereby avoid unnecessary power consumption when the system running conditions are stabilized.

Yet a still further object is to provide a hydraulic tensioning and belt slack take up system in a belt conveyor having a belt take up cylinder wherein a pair of variable volume pumps are constantly responsive to changing load conditions on the belt conveyor to supply pressure fluid to the take up cylinder, said system including a small main pump furnishing small volumes of fluid for accurate control of small system variations and a relatively larger auxiliary pump furnishing larger quantities of fluid for large adjustments in the system.

Other objects and advantages of the invention will become apparent upon a reading of the following specification.

The invention is illustrated more or less diagramatically in the accompanying drawings wherein;

Figure 1 is a side elevation of a flexible strand conveyor system with portions omitted for clarity;

Figure 2 is a schematic diagram of the hydraulic circuit for controlling the belt take up roller in the conveyor system of Figure 1;

Figure 7:
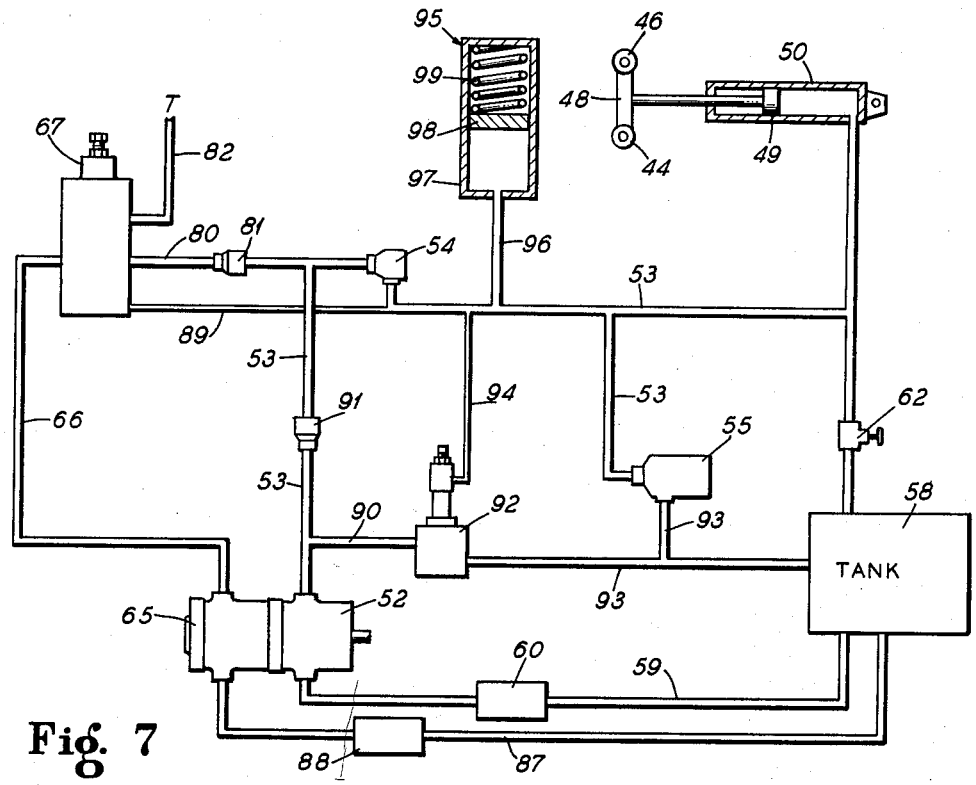
Figure 8:
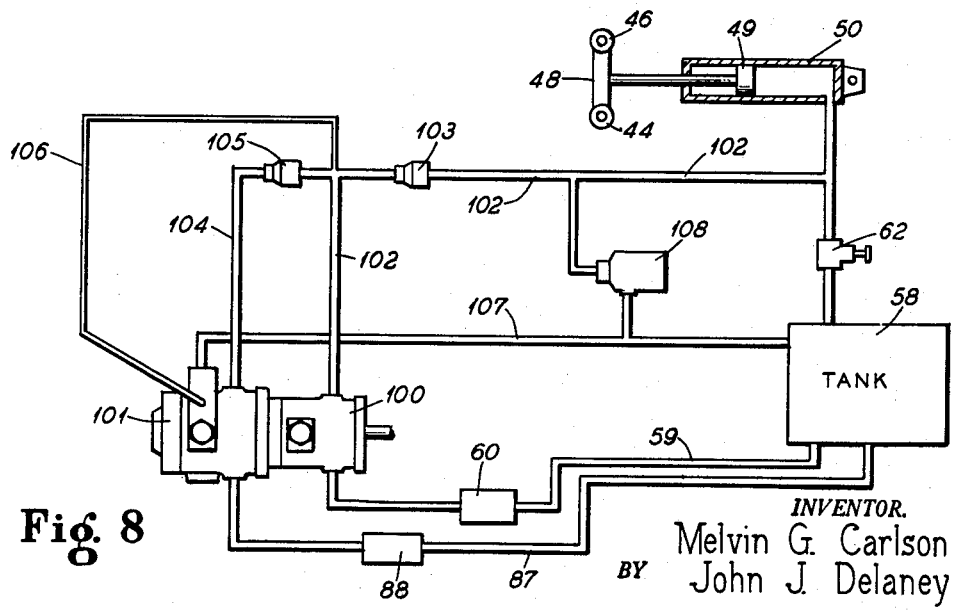

Figures 3, 4, 5, and 6 are diagrammatic representations of tension conditions in the belt and the corresponding direction of movement of the moveable belt pulley which results during periods of start up, slack off, increasing load, and decreasing load respectively;

Figure 7 is a schematic diagram of a variant form of hydraulic circuit for controlling the piston in the take up cylinder and consequently the belt take up roller in the conveyor system of Figure 1; and Figure 8 is a schematic diagram of another variant form of hydraulic circuit for controlling the belt take up piston of the take up cylinder of Figure 1.

Like reference numerals will refer to like parts throughout the following description of the drawings.

In Figure 1 a flexible strand conveyor of the type illustrated in the Craggs et al. Patent 2,773,257 is indicated generally at 10 resting on a mine floor 11. The conveyor includes a flexible belt suspended at intervals along the conveying course by troughing idler assemblies 12 hung from flexible strands 13. The strands in turn are supported by vertically adjustable support stands 14. The troughing idler assemblies in effect form a bed for the conveying reach 15 of the belt. The return reach 16 is supported by return roller assemblies 17 which may be located at substantially greater intervals than the conveying reach idler assemblies since they support no load other than the weight of the belt.

The tail section of the belt is indicated generally at 20. The tail section includes an orbitally movable tail pulley 21 around which the belt is trained. Tail pulley 21 is supported in a frame 22, and side plates 23 form a receiving bin for newly mined material. The conveying reach 15 carries the material to the left.

The head end of the conveyor is illustrated generally at 25. It includes an orbitally movable head pulley 26 around which the belt is trained, the head pulley being supported in a suitable frame structure 27. Since the construction of the head and tail sections do not, of themselves, form an integral part of the invention, they are not further illustrated or described.

A pair of tandem drive pulleys 30, 31 are connected by any suitable drive transmitting linkage 32 to motor M. The return reach 16 of the belt passes in a counterclockwise direction around the orbitally movable head pulley 26, extends rearwardly to upper drive pulley 30 then forwardly to the second drive pulley 31, and then rearwardly to fixed tensioning pulley 33. This pulley is supported by a frame structure which includes reinforced stands 34 and side channels 35. From fixed pulley 33 the belt extends forwardly to reciprocable take up roller 37 and then rearwardly to the tail section of the conveyor. A takeup loop 36 is formed between movable pulley 37 and fixed pulley 33.

A hydraulic tensioning and belt slack take up apparatus for maintaining proper tension in the belt is illustrated in Figure 2.

Roller 37 is supported in a frame structure 41 slidable backwards and forwards along the channels 35. One end of rope 42 is connected to the rear cross brace of the rigid frame structure 41 as at 43 and passes around a series of sheaves 44, 45, 46. The other end of the rope is secured at 47a to a rigid frame structure 47. Sheave 45 is fixed to frame 47, but sheaves 44 and 46 which are mounted on the ends of cross brace 48, are free to move forwards and backwards in the direction of the arrows to the indicated phantom line positions. The cross bar 48 and rope sheaves 44, 46 are reciprocated between the phantom line positions by piston 49 in take up cylinder 50.

The hydraulic system for controlling the piston 49, and consequently the position of belt roller 37 and the tension in the belt, will now be described.

The constant speed motor 51 drives a pump 52 which for future reference will be referred to as the main pump. The pump may have a capacity on the order of 8 or 9 gallons per minute.

High or main pressure line 53 leads from the discharge or high pressure side of the main pump to check valve 54, and then to the right end of cylinder 50. Check valve 54 may be of any suitable construction, but in the preferred embodiment it is made with a neoprene ball or seat so that it holds positively tight when the system is shut off. A relief valve 55 connects into high pressure line 53 through a by pass line 56, and discharges through line 57 into a reservoir or tank 58. A main pump intake line 59 connects the reservoir to the tank and filter 60 is spotted at any convenient location in the line. A second by-pass line 61 connects the tank into main high pressure line 53 and a manually operable needle valve 62 is placed in this line. Relief valve 55 is so adjusted that during normal run conditions, main pump 52 discharges through it into tank 58 whenever the pressure in line 53 exceeds some preset limit, such as, by way of example only, 800 p.s.i. In effect, relief valve 55 limits the maximum pressure in the system.

An auxiliary pump 65 of a somewhat larger capacity the main pump 52 is run from the common shaft of motor 51. The auxiliary pump high pressure line 66 connects the high side of the pump to the head end of a pilot operated unloader valve indicated generally at 67. The unloader valve includes first and second inlet ports 68 and 69 and a pair of outlet ports 70, 71. A dumbbell spool 72 recessed as at 73 to form expanded end portions 74, 75 is adapted to reciprocate in chamber 76. An adjusting means consisting in this instance of an adjustable spring and bolt arrangement 77 bears against the upper end of spool 72. A stem 78 projecting downwardly from end portion 75 reciprocates in a passage leading to inlet port 69. A high pressure sensing line 89 connects port 69 to main high pressure line 53.

A start up pressure line 80 connects outlet port 70 into main high pressure line 53 through check valve 81. When the output of auxiliary pump 65 is added to main pump 52, hydraulic fluid flowing through unloader valve 67 flows into high pressure line 53 through ball check valve 81.

Auxiliary by-pass line 82 connects unloader valve 67 through filter 83 to tank 58. An auxiliary relief valve 84 and flow indicator 85 in filter by-pass line 86 visually indicate whether or not the filters need cleaning.

The auxiliary pump circuit is completed by line 87 containing filter 88 which connects tank 58 to the low pressure side of pump 65.

A variant form of the circuit of Figure 2 in which the heat generated by passage of hydraulic fluid through relief valve 55 is substantially reduced is illustrated in Figure 7. In this embodiment a high pressure diverting line 90 is tapped into the main high pressure line 53 between main pump 52 and check valve 91. The diverting line extends to a second unloading valve 92 which in turn is connected to tank 58 by line 93. A pilot line 94 for unloading valve 92 is tapped into the main high pressure line 53 between check valve 54 and the take up cylinder 50. The inlet of relief valve 55 is connected to main high pressure line 53, and its discharge side is tapped into diverting line 93.

An accumulator indicated generally at 95 is connected into main high presure line 53 by tap 96. The accumulator consists essentially of a cylinder 97 in which piston 98 acted upon by spring 99 reciprocates.

Unloader valve 92 may be set for a pressure range of 750 p.s.i. to 900 p.s.i. for example. When the pressure in the system exceeds 900 p.s.i., the valve will open to dump directly into tank 58. The valve will stay open until the pressure in the system falls below 750, at which time it will close and remain closed until the pressure again builds up to 900 p.s.i.

Another modification of the invention in which a variable volume of hydraulic fluid is furnished to take up cylinder 50 is illustrated in Figure 8. In this figure, a pair of variable volume pumps are indicated at 100 and 101. High pressure line 102 connects the high pressure or discharge side of main pump 100 to cylinder 50 through check valve 103. Check valve 103 is so positioned as to prevent reverse flow in the main high pressure line back to pump 100 through the discharge outlet. A suction line 59 having a filter 60 therein connects tank 58 and main pump 100.

An auxiliary high pressure line 104 connects auxiliary pump 101 into the main high pressure line 102 through check valve 105. This latter check valve prevents higher pressures from reaching the auxiliary pump in the same manner as check valve 103 prevents reverse flow through main pump 100. An auxiliary suction line 87 having a filter 88 therein connects auxiliary pump 101 to tank 58.

A pilot line 106 opening into auxiliary pump 101 is tapped into main high pressure line 102 upstream from check valve 103 and downstream from check valve 105. A low pressure return line 107 connects auxiliary pump 101 directly to tank 58.

A relief valve 108 connects into main high pressure line 102 and to tank 58 through return line 107. Although the size of the main and auxiliary pumps may be varied considerably, the main pump may be a relatively small volume pump on the order of 5 gallons per minute, and the auxiliary pump, a relatively large volume pump, on the order of 30 gallons per minute.

The use and operation of the invention is as follows:

The hydraulic tensioning and slack take up apparatus of this invention provides means for maintaining proper tension in the belt during start up, slack off, varying load and run conditions.

In Figure 2 the system is shown in normal running condition. Pressure fluid such as oil enters the suction side of main pump 52 from tank 58 via suction line 59. The fluid under pressure is discharged from the pump into high pressure line 53, passes through check valve 54 and then enters the right end of cylinder 50. When a condition of equilibrium is reached (that is when the tension in the belt as exerted on the left side of piston 49 is equal to the force of the fluid exerted on the right side of piston 49), the hydraulic fluid passes through by-pass line 56 to relief valve 55 and then to tank 58. Relief valve 55 may be set for example to 800 p.s.i. If any increase in pressure occurs in lines 53 and 56, the valve unseats and fluid bleeds off to tank 58, thus dumping the excess pressure.

During normal operation the capacity of main pump 52, which may be the order of 8 or 9 gallons for example, will be sufficient to take care of variations in tension in the conveyor belt as reflected in slight pressure drops and increases in cylinder 50.

In the illustrated embodiment, auxiliary pump 65, which may have a capacity on the order of 19 gallons for example, is also continuously turning over since it is run from the same motor shaft which runs main pump 52. During normal run conditions, the hydraulic fluid flows through the auxiliary pump along the following path.

Hydraulic fluid flows through auxiliary line 66 from the high pressure side of auxiliary pump 65 to main inlet port 68 of unloader valve 67. The fluid flows through chamber 76 and out main outlet port 71 to conduit 82. Fluid then passes through filter 83 and on into tank 58. The system operator can easily detect whether the filters need cleaning by the reading on the flow indicator. Relief valve 84 is set at a substantially lower value than relief valve 55 since it is utilized only when there is little pressure differential across auxiliary pump 65. A typical value for valve 84 may be on the order of 45 pounds per square inch for example. From tank 58, the hydraulic fluid flows through return line 87 and filter 88 into the suction side of auxiliary pump 65. The resistance of check valve 81 is such that no pressure fluid will pass through it during normal running conditions.

During normal running conditions, the tension on the conveying and return reach of the belt will be substantially the same. Actually the tension will vary from point to point along both the conveying and return reach with the tension increasing towards the head end of the conveying reach and decreasing towards the head end of the return reach. For purposes of illustration however it will be convenient to refer to the tension in both reaches as equal under normal running conditions.

During start up, the tensions in the conveying and return reaches will vary widely. Due to the inherent resiliency in the belt and the friction in the system, the tension in the conveying reach will increase and that in the return reach will decrease. As a result, slack will form in the slack loop 36 and considerable belt slippage around drive pulleys 30, 31 will occur. This slippage generates considerable heat which may result in mine fires. As slack appears in the take up loop 36 however, the pressure to the right of piston 49 will move the piston to the left thereby pulling the roller 37 to the left to take up the slack. Movement of piston 49 in this direction expands the chamber to the right of the piston and consequently lowers the pressure in main high pressure line 53 because the capacity of main pump 52 is not sufficient to maintain the pressure in the expanding chamber. The resultant pressure drop in main line 53 is sensed by sensing line 89 which connects unloader valve 67 to the main line 53. At some given pressure level less than 800 p.s.i. which pressure level can be determined by adjustment of bolt and spring adjustment means 77, the auxiliary pump 65 will cut in.

Thus, as the pressure decreases to some preset value such as 600 p.s.i. in sensing port 69, the spring forces spool 72 downwardly from the position shown in Figure 2. When upper expanded portion 74 is aligned with outlet port 71, circulation to main auxiliary by-pass line 82 is shut off. At the same time, lower expanded portion 75 moves downwardly to fully open communication directly through chamber 76 between inlet port 68 and outlet port 70. The entire output of auxiliary pump 65 is thus added to main high pressure line 53 thru line 80 and check valve 81.

As the pressure in main pressure line 53 builds up, this increase will be sensed by sensing line 89 and the spool 72 will be forced upward away from the head end of the valve and against the adjusting spring. Port 71 will then be exposed permitting auxiliary pump 65 to dump to tank under very low back pressure thus restoring normal running conditions.

In Figures 3 through 6, the slack in the belt and the direction of movement of pulley 37 are diagrammatically illustrated during start up, slack off, and conditions of increasing and decreasing load on the conveyor.

Figure 3:
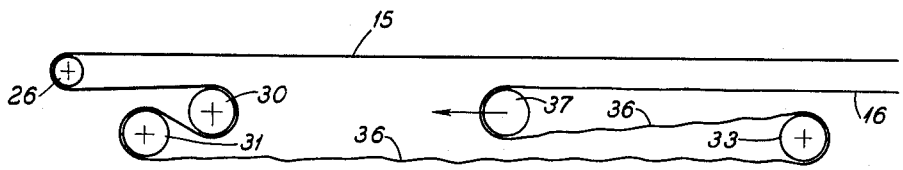

In Figure 3 the conveyor has just been started under no load conditions. The maximum tension in the belt occurs just to left of drive roller 30, and the point of minimum tension in the belt occurs just to the right of drive roller 31. The holding pressure in the hydraulic take up cylinder 50 therefor moves piston 49 to the left which in turn pulls movable belt pulley 37 to the left as indicated by the arrow in the figure. The pressure drop in the system due to the expansion of the pressure chamber in take up cylinder 50 is sensed by unloading valve 67 through pilot line 89 and the output of auxiliary pump 65 is added to that of main pump 52.

Figure 4:
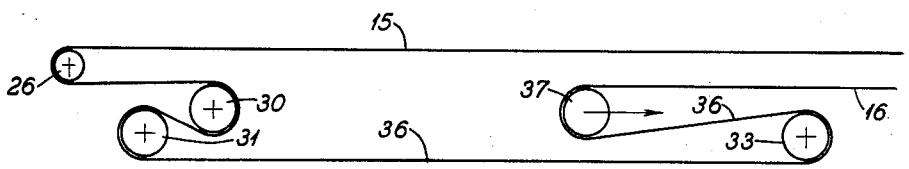

Figure 4 represents a period of adjustment of tensions in the belt immediately after start up and before a load comes on the belt.

When the belt is started, the tension in the conveying reach increases considerably above normal due to the elasticity of the belt and other factors, and the tension in the return reach decreases. If, for example, normal tension in each reach is 1500 pounds, which is equivalent to 800 p.s.i. in cylinder 50, the tension may increase to 2500 pounds in the conveying reach and decrease to 1000 pounds in the return reach. Since the illustrated circuit functions only in response to conditions in the return reach 16, the required tension in it will be obtained before the tension in the conveying reach returns to normal. As the tension in the reaches equalize, after the pumps have built up a pressure of 800 p.s.i. in the hydraulic circuit, the tension in the return reach will rise for a short period of time above 1500 pounds thus urging piston 49 to the right and increasing the pressure in the circuit to 800 p.s.i. plus. As soon as the pressure exceeds 800 p.s.i. relief valve 55 opens and excess fluid is bled out of take up cylinder 50 through relief valve 55 and line 57 into tank 58. The illustrated condition (of a pressure exceeding 800 p.s.i.) may occur for only a very short period of time; say for example two seconds or so. In this connection it should be noted that relief valve 55 is not a range valve; it is a point value valve. The figure shows what happens when relief valve 55 opens up to bring the pressure in high pressure line 53 back to its normal value of 800 p.s.i.

Figure 5:
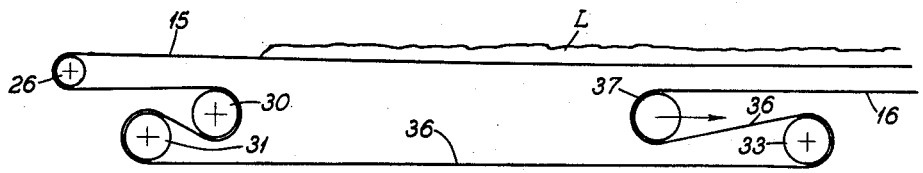

Figure 5 illustrates the movement of take up pulley 37 as the load increases on the conveying reach 15. In this situation (as contrasted to the start up condition of Figure 3), as the load on the belt increases, the tension in conveying reach 15 correspondingly increases. It will be understood that once the belt is running under tension, any increase in tension in the conveying reach will be reflected, to some extent at least, as an increase in tension in the return reach. The increase in tension in the return reach causes pulley 37 to move to the right which in turn urges piston 49 to the right increasing the hydraulic fluid or oil pressure in cylinder 50. When the pressure exceeds 800 p.s.i., relief valve 55 opens and stays open until the pressure falls below 800 p.s.i. Piston 49 and movable pulley 37 move to the right until relief valve 55 closes.

Figure 6:
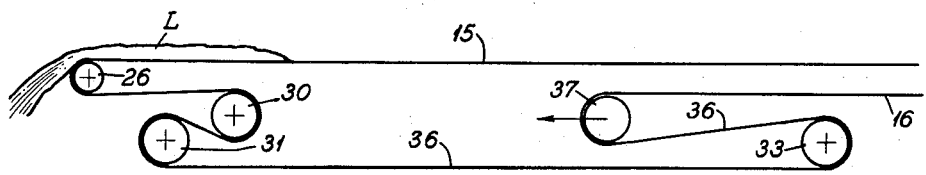

Figure 6 illustrates the movement of take up pulley 37 when the load on the conveyor decreases. When this happens, the force exerted by the 800 p.s.i. pressure in the system on piston 49 overbalances the counteracting force furnished by the belt. Take up pulley 37 therefor moves to the left until the tension in the conveying reach builds up to a normal value.

It will be understood that the normal increments of travel are rather small, although they may range up to around 45 inches or so in a cylinder of the diameter of approximately 4½ inches. It should be further understood that when the conveyor is either completely empty or completely loaded, and stable conditions are obtained, the position of pulley 37 will correspond to Figures 4 and 5 respectively with the arrows omitted.

Needle valve 62 is used when it is desired to take the pressure out of the system when the motor is not running. It is never opened when the motor is running.

In Figure 7, for purposes of illustration, it will be assumed that unloading valve 67 is set at 600 p.s.i., unloading valve 92 is set for 750 to 900 p.s.i., and relief valve 55 is set at 950 p.s.i.

When the belt is started with no load on it, piston 49 in take up cylinder 50 moves to the left under the impetus of the pressure in cylinder 50 due to the appearance of slack in slack take up loop 36. Since the chamber in cylinder 50 expands faster than the volume output of main pump 52, the pressure in the entire circuit will drop. This pressure drop is sensed by unloader valve 67 through pilot line 89 which is tapped into the main high pressure line 53. This pressure drop causes pressure fluid from auxiliary pump 65 to flow into high pressure discharge line 80, through check valves 81 and 54 and into high pressure line 53. Unloading valve 92 and relief valve 55 will remain closed since they are set to open only at pressures considerably above 600 p.s.i. The above described conditions will be maintained so long as the pressure in the circuit remains below 600 p.s.i.

As the pressure in the system builds up past 600 p.s.i. due to the increased volume of hydraulic fluid added by auxiliary pump 65, unloader valve 67 kicks out and fluid flow from auxiliary pump 65 is diverted through the valve to tank 58. Fluid continues to flow however from main pump 52, through high pressure line 53, into accumulator 95 and take up cylinder 50. Unloader valve 92 and relief valve 55 will, of course, remain closed so long as the pressure in the system remains below 900 p.s.i.

When the pressure in the circuit exceeds 900 p.s.i., which in this instance, has been selected as the maximum working pressure, unloader valve 92 kicks out and diverts fluid flow from main pump 52 through diverting lines 90 and 93 to tank 58. Check valve 91, 54 and the check valve built into unloader valve 67 prevent reverse flow of fluid to the pump, and a holding pressure now exists in the circuit.

Accumulator 95 acts as a pressure holding device for maintaining the pressure in the circuit once unloader valve 92 diverts fluid flow from pump 52 to tank 58. When a substantially incompressible fluid such as oil is used, there is always the possibility that the pressure will be lost due to the inherent leakage in the system. The accumulator prevents pressure loss due to leakage until the spring 99 is so extended that it can no longer furnish the necessary holding force.

Should the pressure in the system rise above 950 p.s.i. for any reason, relief valve 55 will open and discharge cylinder 50 to tank 58. Relief valve 55 is a point value valve, and as soon as the pressure drops below 950 p.s.i. it kicks out.

Since unloading valve 92 will not close communciation between lines 90 and 93 until the pressure in the system drops below 750 p.s.i. the effective working pressure range in the system is maintained between 750 p.s.i. and 950 p.s.i.

This embodiment is particularly effective in substantially reducing the heat which would be generated if the system of Figure 2 was run continuously 24 hours a day. Since the main pump 52 of Figure 2, which is a constant volume pump, would always be working against the 800 p.s.i. setting of the relief valve 55, considerable heat would be generated during the course of the day. This difficulty is eliminated in the system of Figure 7 which provides a working range of pressures controlled by an unloader valve which does not require the energy consumption of a relief valve.

In Figure 8, an arrangement which provides sudden increases in volume of hydraulic fluid under starting conditions so as to keep tension in the belt and to maintain good contact between the driving pulley and the belt is illustrated. In this embodiment a variable volume pump arrangement is utilized.

For purposes of illustration, it will be assumed that main pump 100 has a capacity of 5 gallons per minute at no back pressure, the output tapering to substantially no volume at 800 p.s.i., and auxiliary pump 101 has a 30 gallon per minute capacity at no back pressure, the output tapering to substantially no gallons per minute at a back pressure of 600 p.s.i. The relief valve 108 may be set to discharge high pressure line 102 to tank 58 through line 107 when the pressure in the system exceeds some maximum value such as 850 p.s.i. for example. Under these conditions, the normal working pressure range is 800 p.s.i. to 850 p.s.i.

As the conveyor is started, the tension in the return run and correspondingly in the tensioning loop 36 suddenly drops. This decrease in pressure requires a sudden take up on the part of the take up cylinder 50. As soon as the pressure in the cylinder drops, both pumps 100 and 101 flip to a pumping condition and discharge fluid into the take up cylinder 50. Auxiliary large volume pump 101 adds its volume to the small pump and the pressure in the system is quickly brought to 600 p.s.i., after which the larger pump produces no more volume. As the pressure rises above 600 p.s.i., actuating mechanism built into pump 101 which is responsive to the pressure in line 106 causes the pump to discharge to tank at a substantially lower value, such as 100 p.s.i.

The volume output of pump 101 tapers gradually to zero as the pressure approaches 600 p.s.i. so there will be no shock in the system when pump 101 kicks out. The small pump acts as a "vernier" or dribble feed pump which adds the additional necessary small volume of fluid needed to bring the pressure in the system from 600 to 800 p.s.i. When 800 p.s.i. is reached, the main pump supplies substantially no more fluid.

Should the pressure in the system exceed a predetermined value, such as 850 p.s.i., relief valve 108 opens to bleed excess pressure from the cylinder 50 into tank 58. Check valves 103, 105 prevent reverse flow of fluid into the main and auxiliary pumps.

Although a pair of pumps have been illustrated in this embodiment, it would be entirely feasible to use a single variable volume pump. As a practical matter small pumps are desirable for small pressure ranges since the accuracy of a pump varies somewhat in proportion to its capacity.

One outstanding advantage of this arrangement is the smoothness of operation. As the large pump comes up to its maximum 600 p.s.i. setting, it gradually drops off to no volume output. Likewise as the small pump carries on from 600 p.s.i. to 800 p.s.i. it gradually drops off in volume. If the pumps were constant volume pumps such as those illustrated in Figures 2 and 7, a sudden drop off in volume would occur when the large pump cuts out, and another sudden volume drop would occur when the small pump cuts out. This smoothness of operation which is inherent in the variable volume pump arrangement gives extremely fine control over the requirements of the tensioning cylinder.

In addition, almost no heat is generated even if the system is run 24 hours a day because the pumps are not required to force fluid through relief valves during normal running conditions.

The foregoing description is illustrative only and not definitive. Accordingly the invention should not be limited except by the scope of the following appended claims.

We claim:

1. A fluid pressure slack adjusting system for maintaining proper tension in the conveying and return reaches of a flexible belt in a flexible belt conveyor during start-up and run, said system including, in combination, a fluid pressure cylinder having a piston operatively connected to a reciprocable belt takeup loop roller, a first source of fluid pressure, a fluid pressure line between the first source and the cylinder, said source being operable to maintain a first given pressure in the cylinder during run conditions, a second source of fluid pressure, a sensing means for detecting a pressure drop in the cylinder below a second given pressure, said second given pressure being less than said first given pressure, and means responsive to a pressure drop below said second given pressure for adding the pressure from the second source to the cylinder.

2. The fluid pressure slack adjusting system of claim 1 further characterized in that the pressure sensing means is connected into the fluid pressure line.

3. The fluid pressure slack adjusting system of claim 1 further characterized by and including pressure diverting means operable to divert the pressure from the second source to a reservoir when the pressure in the system exceeds the second given pressure.

4. The fluid pressure slack adjusting system of claim 1 further characterized in that the last mentioned means includes a second fluid pressure line connected into the first fluid pressure line between the first source of fluid pressure and the cylinder.

5. A fluid pressure slack adjusting system for maintaining proper tension in the conveying and return reaches of a flexible belt in a flexible belt conveyor during startup and run, said system including, in combination, a fluid pressure cylinder having a piston operatively connected to a reciprocable belt takeup loop roller, said roller being operable when moved in one direction to increase the tension in a belt trained there around and to decrease the belt tension when moved in the other direction, a main pump, a first pressure line between the main pump and the cylinder, said main pump enabling a first given pressure and consequently a first given tension in the belt to be maintained in the cylinder under normal running conditions, an auxiliary pump, a second pressure line from the auxiliary pump to the first pressure line, a pressure sensing means responsive to pressure in the first pressure line, and valve means responsive to a dropping of pressure in the first pressure line below a second pressure less than the first pressure as reported by the pressure sensing means for adding the auxiliary pump to the first pressure line.

6. The fluid pressure slack adjusting system of claim 5 further characterized in that the piston is connected to the belt loop takeup roller by linkage which multiplies a small movement of the piston into a relatively larger movement of the roller.

7. The fluid pressure slack adjusting system of claim 5 further characterized by and including a pressure fluid reservoir, low pressure suction lines from the reservoir to the pumps, and a connecting line between the cylinder and the reservoir.

8. The fluid pressure slack adjusting system of claim 7 further characterized by and including an auxiliary by-pass line between the valve means and the reservoir which provides a pressure fluid flow path for the auxiliary pump which by-passes the main pump and first pressure line.

9. The fluid pressure slack adjusting system of claim 7 further characterized by and including pressure relieving means in the first pressure line to the cylinder, said pressure relieving means including a high pressure by-pass line leading from the pressure relieving means to the reservoir to thereby control the maximum pressure in the system.

10. The fluid pressure slack adjusting system of claim 7 further characterized by and including a check valve in the first pressure line operable to prevent back flow to the main pump.

11. A fluid pressure belt tensioning system for maintaining proper tension in at least the return reach of a flexible belt in a flexible belt conveyor, said system including a fluid pressure cylinder having a piston operatively connected to a reciprocable belt slack take up loop roller, said roller enabling the tension in the belt to be increased when the roller moves in one direction and to be decreased when moved in the opposite direction, a main constant volume pump, a main pressure line between the main pump and the cylinder, an auxiliary constant volume pump, an auxiliary pressure line from the auxiliary pump to the main pressure line whereby the output of the auxiliary pump can be added to the main pump, a reservoir, an auxiliary by-pass line between the main pump and the reservoir, an auxiliary pump suction line between the auxiliary pump and the reservoir, means for sensing the working pressure in the system, auxiliary pump actuating means responsive to pressures below a first pressure as sensed by the pressure sensing means for adding the output of the auxiliary pump to the main pressure line, said auxiliary pump actuating means being responsive to pressures in excess of the first pressure, as sensed by the pressure sensing means, to divert the output of the auxiliary pump to the reservoir through the auxiliary by-pass line, a relief line between the main pressure line and the reservoir and a pressure relief device in the relief line responsive to pressures in excess of a second pressure higher than the first pressure for diverting the output of the main pump to the reservior through the relief line.

12. A fluid pressure belt tensioning system for maintaining proper tension in at least the return reach of a flexible belt in a flexible belt conveyor, said system including a fluid pressure cylinder having a piston operatively connected to a reciprocable belt take up loop roller, said roller enabling the tension in the belt to be increased when the roller moves in one direction and to be decreased when moved in the opposite direction, a main constant volume pump, a main pressure line between the main pump and the cylinder, an auxiliary constant volume pump, said auxiliary pump having a substantially larger capacity than the main pump, an auxiliary pressure line from the auxiliary pump to the main pressure line whereby the output of the auxiliary pump can be added to the main pump, a reservoir, an auxiliary by-pass line between the auxiliary pump and the reservoir, a main pump suction line between the main pump and the reservoir, an auxiliary pump suction line between the auxiliary pump and the reservoir, means for sensing the working pressure in the system, auxiliary pump actuating means responsive to pressures below a first pressure as sensed by the pressure sensing means for adding the output of the auxiliary pump to the main pressure line, said auxiliary pump actuating means being responsive to pressures in excess of the first pressure, as sensed by the pressure sensing means, to divert the output of the auxiliary pump to the reservoir through the auxiliary by-pass line, a pressure unloader device in the main pressure line for diverting the main pump output to the reservoir when a second pressure higher than the first occurs in the system, said unloader device further including means for blocking communication between the main pump and the reservoir when the pressure in the system reaches a third value between the first and second pressures after reaching the second pressure, a return line between the cylinder and the reservoir, and a relief device in the return line for diverting fluid in the cylinder to the reservoir when the pressure in the system reaches a fourth value greater than the second.

13. A fluid pressure belt tensioning system for maintaining proper tension in at least the return reach of a flexible belt in a flexible belt conveyor, said system including a fluid pressure cylinder having a piston operatively connected to a reciprocable belt take up loop roller, said roller enabling the tension in the belt to be increased when the roller moves in one direction and to be decreased when moved in the opposite direction, a main constant volume pump, a main pressure line between the main pump and the cylinder, an auxiliary constant volume pump, said auxiliary pump having a substantially larger capacity than the main pump, an auxiliary pressure line from the auxiliary pump to the main pressure line whereby the output of the auxiliary pump can be added to the main pump, a reservoir, an auxiliary by-pass line between the auxiliary pump and the reservoir, a main pump suction line between the main pump and the reservoir, an auxiliary pump suction line between the auxiliary pump and the reservoir, means for sensing the working pressure in the system, auxiliary pump actuating means responsive to pressures below a first pressure as sensed by the pressure sensing means for adding the output of the auxiliary pump to the main pressure line, said auxiliary pump actuating means being responsive to pressures in excess of the first pressure, as sensed by the pressure sensing means to divert the output of the auxiliary pump to the reservoir through the auxiliary by-pass line, a pressure unloader device in the main pressure line for diverting the main pump output to the reservoir when a second pressure higher than the first occurs in the system, said unloader device further including means for blocking communication between the main pump and the reservoir when the pressure in the system reaches a third value between the first and second pressures after reaching the second pressure, a return line between the cylinder and the reservoir, a relief device in the return line for diverting fluid in the cylinder to the reservoir when the pressure in the system reaches a fourth value greater than the second, and a mechanical pressure holding device in the main pressure line for maintaining the pressure in the system when the unloading device diverts the main pump output to the reservoir.

14. A fluid pressure belt tensioning system for maintaining proper tension in at least the return reach of a flexible belt in a flexible belt conveyor, said system including a fluid pressure cylinder having a piston operatively connected to a reciprocable belt take up loop roller, said roller enabling the tension in the belt to be increased when the roller moves in one direction and to be decreased when moved in the opposite direction, a main variable volume pump, a main pressure line between the main pump and the cylinder, an auxiliary variable volume pump, said auxiliary pump having a substantially larger capacity than the main pump, an auxiliary pressure line from the auxiliary pump connecting into the main pressure line, a reservoir, an auxiliary by-pass line between the auxiliary pump and the reservoir, a main pump suction line between the main pump and the reservoir, an auxiliary pump suction line between the auxiliary pump and the reservoir, said auxiliary pump having a maximum output at substantially no back pressure which tapers to substantially no output at a first pressure in the system, said main pump having a maximum output at substantially no back pressure which tapers to substantially no output at a second pressure in the system higher than the first pressure, said auxiliary pump further including means for diverting its output to the auxiliary by-pass line at a third pressure substantially lower than the first pressure after the first pressure is reached, a return line between the cylinder and the reservoir and a relief device in the return line for diverting the fluid in the cylinder to the reservoir when the pressure in the system reaches a fourth value higher than the second.

No references cited.